(12) United States Patent
Irie et al.

(10) Patent No.: US 9,691,007 B2
(45) Date of Patent: Jun. 27, 2017

(54) IDENTIFICATION APPARATUS AND METHOD FOR CONTROLLING IDENTIFICATION APPARATUS

(71) Applicant: OMRON Corporation, Kyoto-shi, Kyoto (JP)

(72) Inventors: Atsushi Irie, Nara (JP); Mutsuki Takagiwa, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 14/840,109

(22) Filed: Aug. 31, 2015

(65) Prior Publication Data

US 2016/0070987 A1 Mar. 10, 2016

(30) Foreign Application Priority Data

Sep. 5, 2014 (JP) ................................. 2014-181638

(51) Int. Cl.
G06K 9/00 (2006.01)
G06K 9/62 (2006.01)
G06K 9/52 (2006.01)

(52) U.S. Cl.
CPC ....... *G06K 9/6267* (2013.01); *G06K 9/00288* (2013.01); *G06K 9/52* (2013.01);
(Continued)

(58) Field of Classification Search
CPC .............. G06K 9/6292; G06K 9/6267; G06K 9/00288; G06K 9/52; G06K 9/626; G06K 2009/00322
(Continued)

(56) References Cited

U.S. PATENT DOCUMENTS 6,944,342 B1 * 9/2005 Stahl .................... G06K 9/6292
382/156
8,140,450 B2 * 3/2012 Porikli ................. G06N 99/005
706/12
(Continued)

FOREIGN PATENT DOCUMENTS

JP 5287333 B2 9/2013
KR 2012-0048668 A 5/2012

OTHER PUBLICATIONS

Extended European Search Report in counterpart European Application No. 15 18 1490.2 issued Mar. 30, 2016 (9 pages).
(Continued)

*Primary Examiner* — Daniel Mariam
(74) *Attorney, Agent, or Firm* — Osha Liang LLP (57) ABSTRACT

An identification apparatus performs classification using a plurality of classifiers, and calculates the reliability of its classification result. A data obtaining unit obtains input data. A feature quantity obtaining unit obtains a feature quantity corresponding to the input data. A plurality of classifiers receive input of the feature quantity and perform classification based on the input feature quantity. An identification unit inputs the feature quantity into each of the classifiers, and generates a single second classification result based on a plurality of classification results obtained from the classifiers. A reliability generation unit generates a reliability of the second classification result based on variations across the plurality of classification results.

10 Claims, 7 Drawing Sheets

(52) U.S. Cl.
CPC ........... *G06K 9/626* (2013.01); *G06K 9/6292* (2013.01); *G06K 2009/00322* (2013.01)

(58) Field of Classification Search
USPC .............................. 382/159, 224, 118, 160
See application file for complete search history.

(56) References Cited

U.S. PATENT DOCUMENTS

| | | | |
|---|---|---|---|
| 8,498,491 | B1 | 7/2013 | Steffens |
| 8,594,385 | B2 * | 11/2013 | Marchesotti ........... G06K 9/036 |
| | | | 382/112 |
| 8,644,624 | B2 * | 2/2014 | Tao .................... G06K 9/00684 |
| | | | 382/155 |
| 2006/0120609 | A1 | 6/2006 | Ivanov et al. |
| 2010/0217743 | A1 | 8/2010 | Ueki |
| 2012/0195475 | A1 | 8/2012 | Abiko |
| 2014/0112556 | A1 * | 4/2014 | Kalinli-Akbacak .... G10L 25/63 |
| | | | 382/128 |

OTHER PUBLICATIONS

S. Theodoridis et al; "Pattern Recognition"; 4th Edition; pp. 222-230; Jan. 1, 2009 (9 pages).
Office Action in counterpart Korean Patent Application No. 10-2015-0116547 issued on Aug. 26, 2016 (9 pages).

\* cited by examiner

IDENTIFICATION APPARATUS AND METHOD FOR CONTROLLING IDENTIFICATION APPARATUS

CROSS-REFERENCE TO RELATED APPLICATION

This application claims priority to Japanese Patent Application No. JP2014-181638, filed on Sep. 5, 2014, the contents of which are hereby incorporated by reference herein in its entirety.

FIELD OF THE INVENTION

One or more embodiments of the present invention generally relate to an identification apparatus and a method for controlling an identification apparatus.

BACKGROUND

Research has been underway to develop techniques for analyzing images and directly or indirectly identifying a variety of information included in the images. For example, an image including a face of a person (a face image) may be analyzed to identify the person's gender, age, or facial expressions.

For example, Patent Literature 1 describes an age estimation apparatus that extracts feature quantities from an image and estimates the age of a person based on the feature quantities. More specifically, the age estimation apparatus inputs the feature quantities extracted from the image into its multiclass classifier, which performs classification by age, determines an estimated age using an output from the classifier, and outputs the estimated age.

Patent Literature

Patent Literature 1: Japanese Patent No. 5287333

SUMMARY

The accuracy of such classification using the extracted feature quantities depends largely on the accuracy of the classifiers. The reliability of the classification result may be quantified into a numerical value with known techniques using the outputs from these classifiers. For example, the apparatus described in Patent Literature 1 determines the reliability of its classification using attribute probabilities output from the classifiers, and calculates an error in the estimated age (±n years) based on the determined reliability.

To estimate age, the apparatus described in Patent Literature 1 includes the multiclass classifier that combines a plurality of two-class classifiers. Another approach uses a plurality of multiclass classifiers to classify information. For example, such an approach to estimate age may use a plurality of multiclass classifiers with different methods of classification, or may use a plurality of multiclass classifiers that have undergone learning with different sets of learning data, and determine an estimated age by combining outputs from the classifiers. This approach is called ensemble learning, and is used to improve classification accuracy.

However, different classifiers used in combination have outputs with different accuracies. This creates difficulties in calculating the reliability of the entire apparatus.

One or more embodiments of the present invention are directed to an identification apparatus including a plurality of classifiers for classification, and capable of calculating the reliability of its classification result.

One or more embodiments of the present invention provide an identification apparatus including a data obtaining unit, a feature quantity obtaining unit, a plurality of classifiers, an identification unit, and a reliability generation unit. The data obtaining unit obtains input data. The feature quantity obtaining unit obtains a feature quantity corresponding to the input data. The classifiers receive input of the feature quantity and perform classification based on the input feature quantity. The identification unit inputs the feature quantity into each of the classifiers, and generates a single second classification result based on a plurality of classification results obtained from the classifiers. The reliability generation unit generates a reliability of the second classification result based on variations across the plurality of classification results.

The input data is typically an image, but may not be an image.

The feature quantity obtaining unit obtains the feature quantity from input data. The feature quantity may correspond to the entire input data or may correspond to a part of the input data. When, for example, the input data is an image, the feature quantity may be obtained from an area included in the image.

The classifier performs classification based on the input feature quantity. The classification may use any classes associated with the input data. When, for example, the input data is an image including a face of a person (hereafter, a face image), the classes cover age, gender, face orientations, or specific facial expressions (e.g., joy, sadness, and anger) of that person.

The identification unit generates a single classification result (second classification result) based on the plurality of classification results obtained from the classifiers. When, for example, the classification target is age, the identification unit obtains a plurality of estimated ages from the classifiers, and generates a single estimated age based on the plurality of estimated ages. The single classification result may be generated using the average, median, or mode of values indicating the plurality of classification results, or may be generated with other methods.

The reliability generation unit generates a reliability of the second classification result. The reliability of the second classification result is determined based on variations across the classification results output from the classifiers.

For example, the reliability generation unit may determine the reliability to provide a negative correlation between the variations across the plurality of classification results and the reliability.

A large variance of the classification results output from the classifiers means a low accuracy of the entire classification. Thus, when the variations across the classification results are large, the reliability of the second classification result maybe calculated as a small value. When the varieties across the classification results are small, the reliability of the second classification result may be calculated as a large value.

Each classifier may be a multiclass classifier, and output a class value corresponding to a class indicated by a classification result obtained by the classifier.

The multiclass classifier outputs a class most likely for the input feature quantity (a class with the highest likelihood) selected from a plurality of classes. The multiclass classifier may be a single classifier or may combine a plurality of two-class classifiers.

The reliability generation unit may generate the reliability of the second classification result based on a variance or a standard deviation of class values output from the classifiers.

The variations across the classification results can be expressed as a variance or a standard deviation of the class values.

The reliability generation unit may determine the variance or the standard deviation using a median or a mode of the class values output from the classifiers.

If the average of the class values is used to calculate the variance or the standard deviation, an outlier output from a classifier (a classification result greatly distant from the outputs from other classifiers) can cause inaccuracy of the generated reliability. Using the median or the mode of the class values will reduce influence of such noise.

The identification apparatus according to one or more embodiments of the present invention may further include an evaluation unit that evaluates an accuracy of each of the classifiers. The identification unit or the reliability generation unit may weight the classification result of each classifier in accordance with the evaluated accuracy of the classifier, and generate the second classification result or the reliability.

A higher accuracy of a classifier means that the class value output from the classifier is nearer a true value. Thus, the result output from each classifier is weighted based on the accuracy of the classifier to increase the correctness of the second classification result or the reliability.

The evaluation unit may evaluate the accuracy of each classifier using test data. The evaluation unit may evaluate the accuracy of each classifier using the number of learning samples used in the learning of the classifier.

The accuracy of each classifier may be evaluated using test data (data with a correct answer), or may be evaluated using the number of learning samples. For example, a classifier with more learning samples is evaluated to have a higher accuracy.

The input data may include an image. The identification apparatus according to one or more embodiments of the present invention may be used for an apparatus that identifies an object included in the image.

A target for classification performed by each classifier may include at least one of an attribute or a state of a person included in the image.

The attribute of the person includes the age, gender, or race of the person. The state of a person includes a face orientation, a line of vision, or the degree of a specific facial expression.

One or more embodiments of the present invention provide an identification apparatus including at least one of the above functional units. Further, one or more embodiments of the present invention provide a method for controlling the identification apparatus described above, or a program for controlling the identification apparatus described above. The processes or the functional units may be combined with one another freely when such combination causes no technical contradictions.

The identification apparatus according to one or more embodiments of the present invention includes a plurality of classifiers for classification, and is capable of calculating the reliability of its classification result.

DETAILED DESCRIPTION

System Configuration

One or more embodiments of the present invention will now be described with reference to the drawings.

Figure 1:
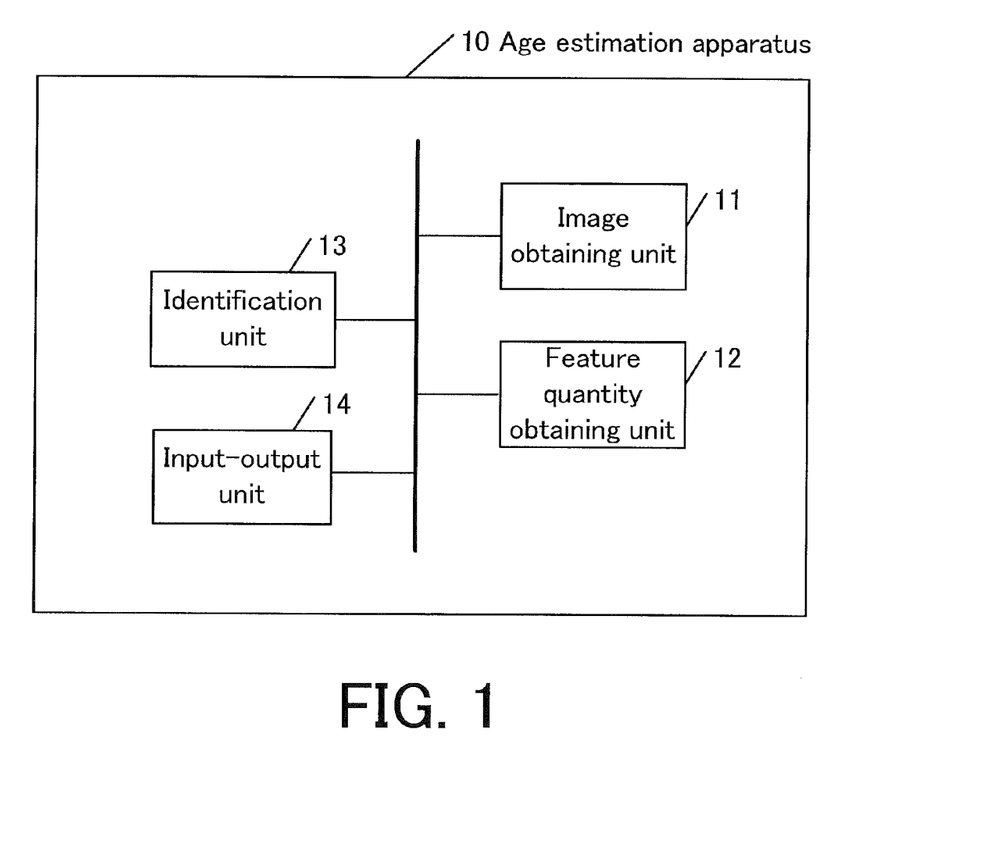
FIG. 1 is a block diagram showing the system configuration of an age estimation apparatus according to a one or more embodiments.

An age estimation apparatus according to a one or more embodiments estimates the age of a person based on a face of the person in an image. FIG. 1 is a block diagram showing the system configuration of an age estimation apparatus 10 according to one or more embodiments.

The age estimation apparatus 10 includes an image obtaining unit 11, a feature quantity obtaining unit 12, an identification unit 13, and an input-output unit 14.

The image obtaining unit 11 obtains a processing target image (a face image). The image obtaining unit 11 is typically a memory device, such as a fixed disk drive or a flash memory. The image obtaining unit 11 may be a device (e. g., an interface device or a wireless communicator) that obtains an image from an external source, or may be a device that captures an image with a lens and an imaging sensor.

The feature quantity obtaining unit 12 obtains the feature quantities of an image obtained by the image obtaining unit 11. More specifically, the feature quantity obtaining unit 12 extracts an area corresponding to a face (a face area) among pixels forming the obtained image, and obtains a set of feature quantities (vector indicating the feature quantities) included in the face area. The feature quantity obtaining unit 12 may obtain a set of feature quantities corresponding to a face area, or a set of feature quantities corresponding to selected pixels in the face area.

The identification unit 13 outputs a classification result (an estimated age of the subject person) and an evaluation value for the classification result (a value indicating the reliability of the estimated age). More specifically, the identification unit 13 includes a plurality of multiclass classifiers, and generates a single classification result based on the outputs from the multiclass classifiers, and an evaluation value for the single classification result.

Figure 2:
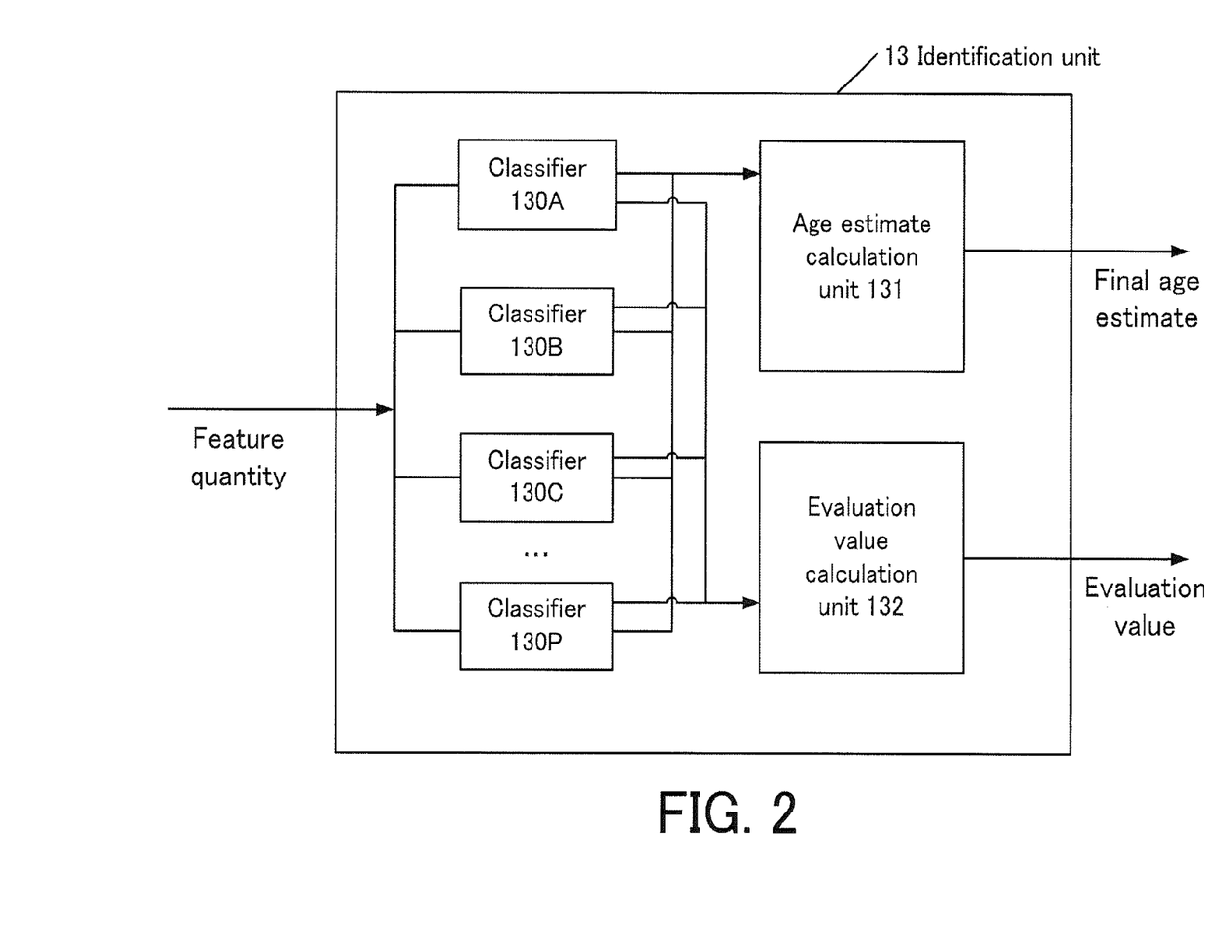
FIG. 2 is a diagram describing the detailed structure of an identification unit according to one or more embodiments.

FIG. 2 is a block diagram of the identification unit 13 according to one or more embodiments. Each of the classifiers (130A to 130P) included in the identification unit 13 is a multiclass classifier that includes a plurality of support vector machines (SVMs). The SVMs are two-class classifiers, which are combined to form a multiclass classifier. These classifiers have undergone supervised learning using training data.

Although each multiclass classifier includes SVMs in one or more embodiments, each multiclass classifier may not include SVMs but may include other two-class classifiers. These multiclass classifiers may use algorithms known in the art. For example, each multiclass classifier may narrow the range of classification through binary search performed using a plurality of two-class classifiers that halve the age range, or may use attribute probabilities obtained by a plurality of two-class classifiers and estimate the true value.

Each classifier may be a single multiclass classifier.

The algorithms usable by the classifiers include random forests, which use a plurality of decision trees, boosting, which uses a plurality of weak classifiers, and AdaBoost, or adaptive boosting, which performs weighting in accordance with misclassification rates in boosting. The classifiers may use one or more of these algorithms. The classifiers may use any algorithm that can determine a class corresponding to feature quantities from a plurality of classes.

The different classifiers may use different methods (algorithms) in their classifications, or they may have undergone learning with different sets of training data.

In one or more embodiments, the sixteen classifiers 130A to 130P obtain classification results. An age estimate calculation unit 131 (an identification unit) generates a single classification result (a second classification result) based on these classification results. An evaluation value calculation unit 132 (a reliability generation unit) calculates an evaluation value representing the reliability of the second classification result based on variations across the classification results. In one or more embodiments, the reliability (evaluation value) is calculated to provide a negative correlation between the variations across the classification results and the reliability of the second classification result. For example, the evaluation value may be calculated as a maximum value when a value indicating the variations across the classification results (e.g., a variance or a standard deviation) is at its minimum of the possible range. The evaluation value may be calculated as a minimum value when the variation value is at its maximum. When the variation value falls between the minimum and the maximum, the evaluation value may be calculated as a value that decreases continuously or in stages in accordance with the variation value. Specific methods for generating the classification results and calculating the evaluation values will be described later.

The input-output unit 14 receives an input operation performed by the user, and provides information to the user. More specifically, the input-output unit 14 includes a touch panel and its controller, and a liquid crystal display and its controller. In one or more embodiments, the touch panel and the liquid crystal display form a single touch panel display.

The functional units described above may be implemented by dedicated hardware or by software modules. These functional units may be implemented by a field programmable gate array (FPGA), an application-specific integrated circuit (ASIC), or a combination of these.

When the functional units are implemented by software, a program stored in an auxiliary storage is loaded onto a main memory and executed by a central processing unit (CPU) to achieve these functions (the CPU, the auxiliary storage, and the main memory are not shown in the figure).

Age Estimation Overview

The age estimation apparatus 10 performs an age estimation process described briefly below. The process performed by the age estimation apparatus 10 includes a phase for obtaining feature quantities from a face image, and a phase for estimating the age using the obtained feature quantities.

(1) Feature Quantity Obtaining Phase

The phase for obtaining feature quantities from a face image (feature quantity obtaining phase) will now be described. The feature quantity obtaining unit 12 implements the processing described below to obtain feature quantities corresponding to a face image.

Figure 3:
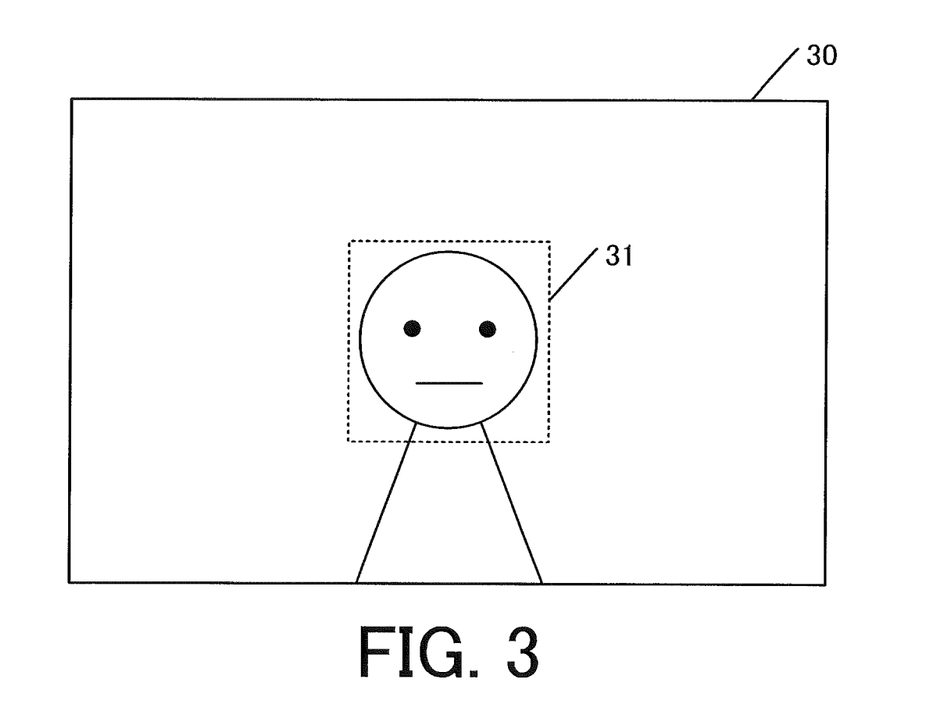
FIG. 3 is a diagram illustrating a face area included in an image according to one or more embodiments.

The feature quantity obtaining unit 12 first obtains a face image from the image obtaining unit 11, and detects an area including a face of the subject person (a face area) from the face image. FIG. 3 shows a face image 30 and a detected face area 31. The face area is detected by, for example, pattern matching performed using texture information, or template matching performed using a template shaped with the contour of the face. The face area may be determined by template matching based on facial components, or by using extracted areas or points corresponding to parts of the face. The face area may be determined by detecting a skin-colored area in the face image. Any known techniques may be used to detect the face area.

Subsequently, multiple feature points are defined in the detected face area. The feature points are defined based on, for example, the positions of facial components (e.g., eyes, a nose, nostrils, a mouth, eyebrows, a chin, or a forehead). The facial components to be detected may be preset or may be set dynamically.

The feature points are defined based on the positions of the detected facial components. These feature points may be arranged more densely at positions nearer the facial components and more sparsely at positions less near the facial components. The feature points may be defined with another method in accordance with the attributes of the subject person when such attributes are more or less known.

The feature quantities are calculated based on the defined feature points. The feature quantities may be calculated using values obtained through filtering using, for example, a Gabor filter.

In one or more embodiments, the feature points are defined after the face area is detected, and the feature quantities are calculated using the future points. However, the feature quantities may be calculated with other methods. For example, the feature quantities may be calculated directly from the detected face area.

This phase yields the feature quantities of multiple dimensions (or hereafter the feature vector) corresponding to the face area.

(2) Age Estimate Phase

The feature vector obtained by the feature quantity obtaining unit 12 is input into each of the classifiers 130A to 130P included in the identification unit 13. Each classifier performs classification based on the feature vector. The classification results, or the classes output from the respective classifiers (the estimated ages of the subject person in one or more embodiments) are input into both the age estimate calculation unit 131 and the evaluation value calculation unit 132. More specifically, 16estimated ages are input into both the age estimate calculation unit 131 and the evaluation value calculation unit 132.

Figure 4:
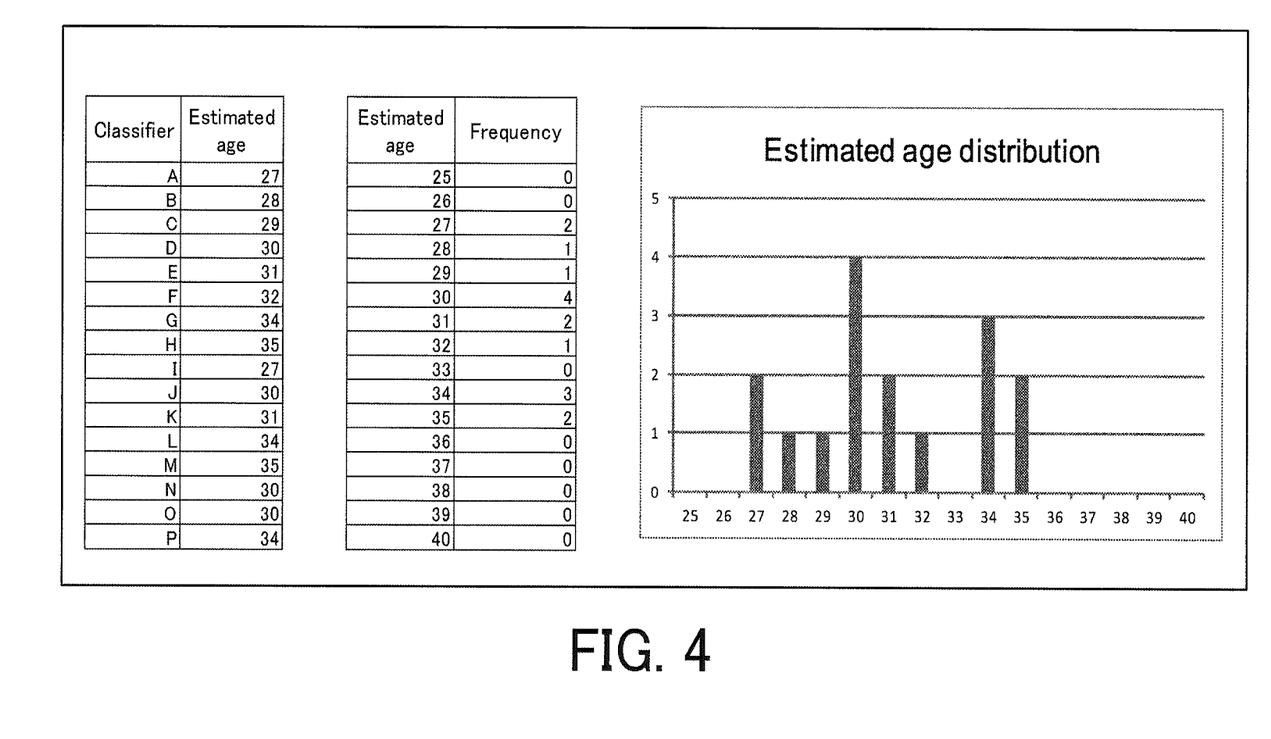
FIG. 4 is a diagram showing a distribution of estimated ages according to one or more embodiments.

FIG. 4 is a diagram showing the estimated ages output from the 16 classifiers and a histogram representing the distribution of the estimated ages.

The age estimate calculation unit 131 calculates a single estimated age (hereinafter referred to as a "final age estimate") based on the obtained estimated ages, and outputs the final age estimate. More specifically, the age estimate calculation unit 131 outputs the average of the obtained estimated ages as the final age estimate. In the example of FIG. 4, the average is 31.1. The final age estimate may not be the average, but may be, for example, the median or the mode. In the example of FIG. 4, the median is 30.5 and the mode is 30.0. The final age estimate may be calculated with any method that uses the estimated ages obtained from the separate classifiers.

The evaluation value calculation unit 132 then calculates an evaluation value based on the obtained estimated ages. The evaluation value correlates with the reliability of the final age estimate. In one example, the evaluation value is defined in the patterns described below, where $\sigma$ is a standard deviation and n is an integer not less than 2.

Pattern 1: The evaluation value is either the variance $\sigma^2$ or the standard deviation $\sigma$.

Pattern 2: The evaluation value is an integer multiple of the value obtained in pattern 1. The evaluation value is $n\sigma^2$ or $n\sigma$.

Pattern 3: The evaluation value is the reciprocal $1/\sigma^2$ of the variance, or is the reciprocal $1/\sigma$ of the standard deviation.

Pattern 4: The evaluation value is an integer multiple of the value obtained in pattern 3. The evaluation value is $n/\sigma^2$ or $n/\sigma$.

For patterns 1 and 2, a higher evaluation value means a lower reliability (a lower estimation accuracy of the final age estimate). For patterns 3 and 4, a higher evaluation value means a higher reliability (a higher estimation accuracy of the final age estimate).

Figure 5:
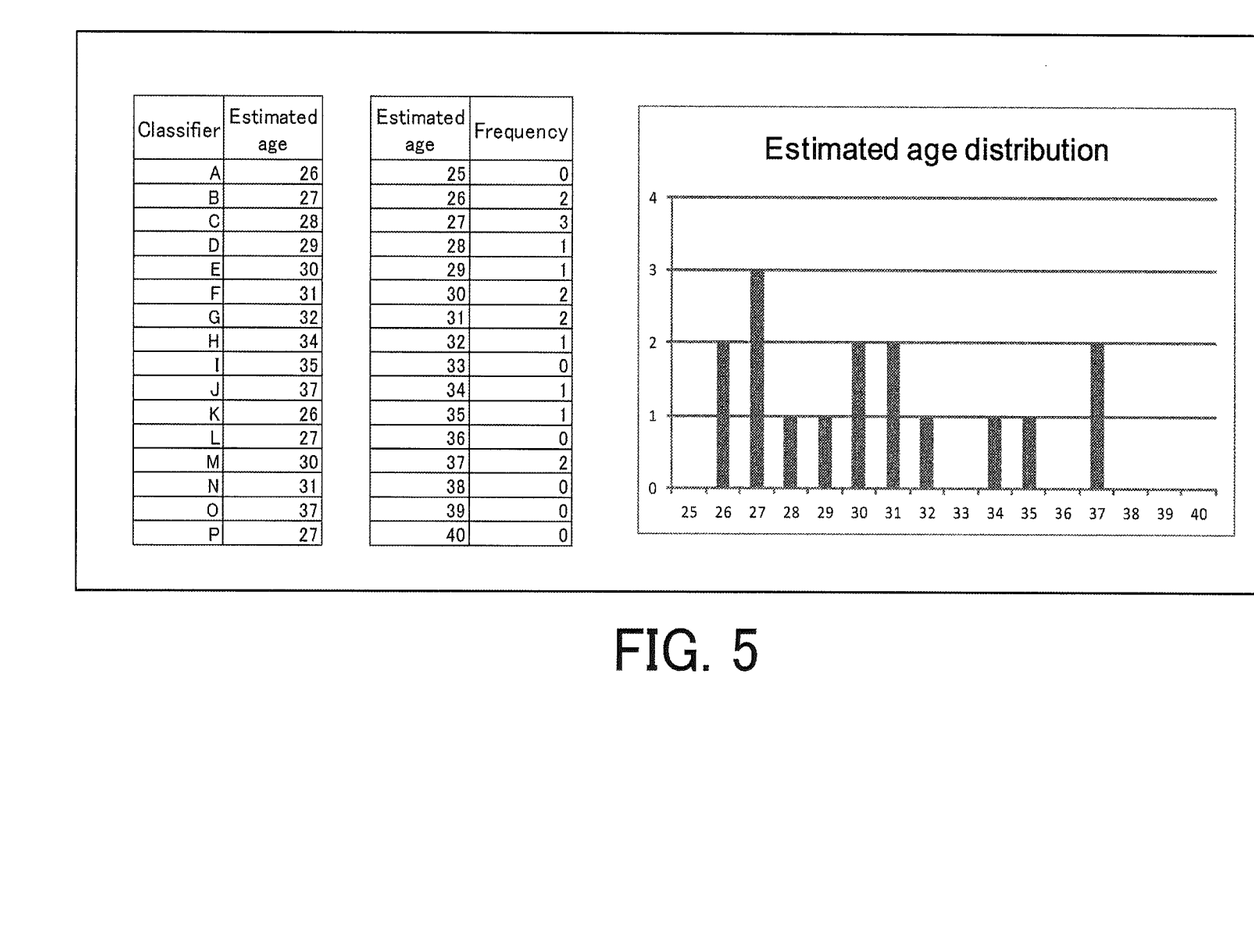
FIG. 5 is a diagram showing another distribution of estimated ages according to one or more embodiments.

In one or more embodiments, the variance $\sigma^2$ is used as the evaluation value. The evaluation value is 6.8 in the example of FIG. 4. In the example of FIG. 5 where the estimated ages vary, the evaluation value is 12.9, indicating a low accuracy of the age estimate.

Figure 6A:
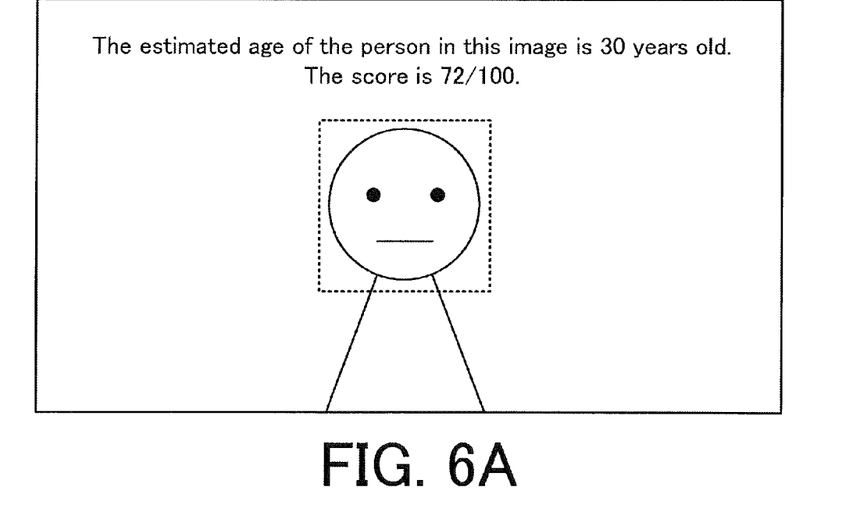
FIGS. 6A and 6B are diagrams showing screens provided to the user according to one or more embodiments.

The calculated evaluation value may be provided to the user without any conversion, or may be normalized to fall within a predetermined range (for example, converted to a score in a range of 0 to 100). FIG. 6A shows a screen displaying a score resulting from such conversion of the evaluation value. The evaluation value may be converted into a score with any technique. The evaluation value calculation unit 132 may store data for such conversion.

Flowchart

Figure 7:
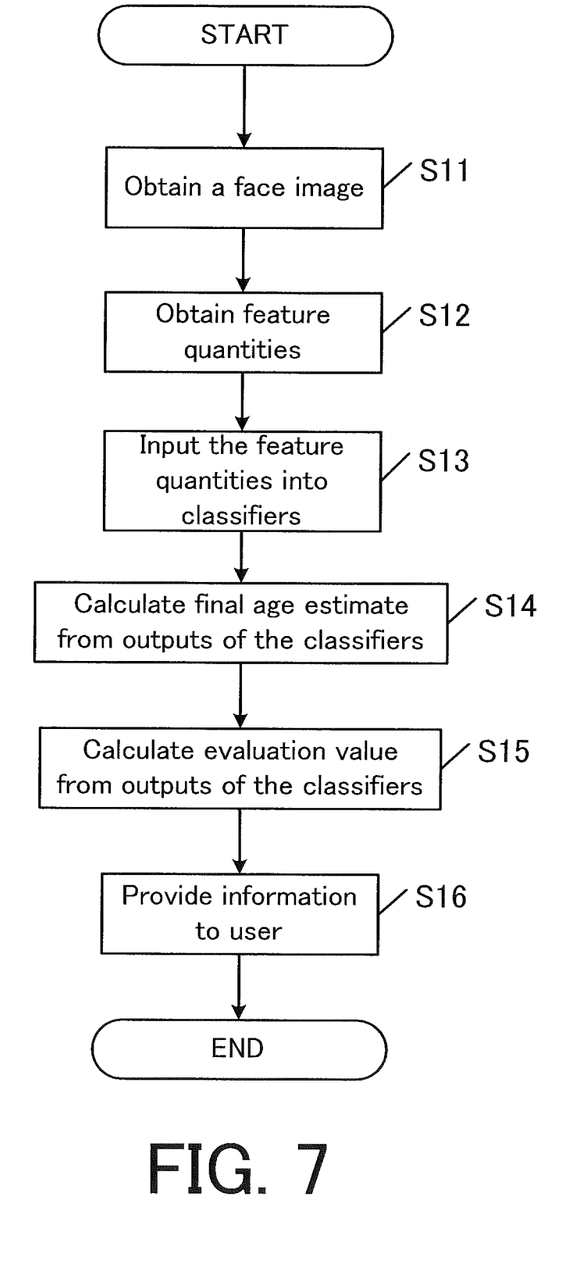
FIG. 7 is a flowchart of processing performed by the age estimation apparatus according to one or more embodiments.

FIG. 7 is a flowchart showing the age estimation process performed by the age estimation apparatus 10 according to one or more embodiments. The process is started by a user operation (e.g., reading an image that has been stored).

In step S11, the image obtaining unit 11 obtains a face image. Although the image obtaining unit 11 obtains an image stored in a storage in one or more embodiments, the image may be obtained with a communication unit or with an image capturing unit.

In step S12, the feature quantity obtaining unit 12 obtains a feature vector from the face image with the procedure described above.

In step S13, the identification unit 13 inputs the feature vector obtained by the feature quantity obtaining unit 12 into each of the classifiers.

In step S14, the age estimate calculation unit 131 obtains the estimated age output from each classifier, calculates the average of the estimated ages, and outputs the average as a final age estimate.

In step S15, the evaluation value calculation unit 132 obtains the estimated age output from each classifier, calculates the variance of the estimated ages, and outputs the variance as an evaluation value.

In step S16, the input-output unit 14 provides the user with the final age estimate and its evaluation value (or a score generated based on the evaluation value) by displaying the value on the screen.

As described above, the age estimation apparatus according to one or more embodiments classifies information using the plurality of multiclass classifiers, generates and provides the single estimated age and its evaluation value based on the plurality of classification results. In this manner, the age estimation apparatus provides the user with information indicating the reliability of the estimated age.

An age estimation apparatus according to one or more embodiments weights an output of each classifier included in the identification unit 13, and calculates a final age estimate and its evaluation value using the weighted values.

In one or more embodiments, the age estimate calculation unit 131 calculates the final age estimate, and the evaluation value calculation unit 132 calculates the evaluation value after multiplying the results from the classifiers by weights.

The weight used for each classifier may be determined in accordance with the accuracy of each classifier. More specifically, a classifier with a higher accuracy is given a greater weight, whereas a classifier with a lower accuracy is given a smaller weight. For example, a classifier that has undergone learning with more sets of data may be determined to be a classifier with a higher accuracy, and may be given a greater weight. Each classifier may be rated using evaluation data with a correct answer, and a classifier with a better rating may be given a greater weight.

When the classifiers use the random forests algorithm, the accuracy of each classifier may be determined by the depth of the trees. For example, a classifier with deeper trees may be given a greater weight than a classifier with shallower trees.

The age estimation apparatus according to one or more embodiments improves the calculation accuracy of the final age estimate and the evaluation value using the weighting performed in accordance with the accuracy of each classifier. Although the age estimation apparatus of one or more embodiments calculates the final age estimate and the evaluation value using the same weights, these calculations may use different weights, or one of the two calculation processes may use weighting.

Modifications

One or more of the above embodiments are mere examples, and various modifications are possible without departing from the spirit and scope of the invention.

Although the apparatus according to one or more of the embodiments described above estimates age, the apparatus may estimate other information such as gender, a face orientation (an angle of direction or an angle of elevation of a face to the camera), a line of vision, the degree of a specific facial expression (e.g., joy, anger, sadness, surprise, fear, disgust, or a lack of expression), or any other information.

Although the classifiers output numerical values indicating the classification results in one or more of the above embodiments, the classifiers may not directly output numerical values. To calculate the variance and the standard deviation, this modification will involve an additional process of converting the classification results into numerical values.

Although the feature vector obtained by the feature quantity obtaining unit 12 is input into the classifiers included in the identification unit 13, the classifiers may not use all dimensions of the feature vector. For example, the classifiers may filter the feature vector to have predetermined dimensions, and use the feature quantities in the predetermined dimensions.

The feature quantity obtaining unit 12 may use different methods to calculate a plurality of feature vectors, and may input a different feature vector into each classifier.

Figure 6B:
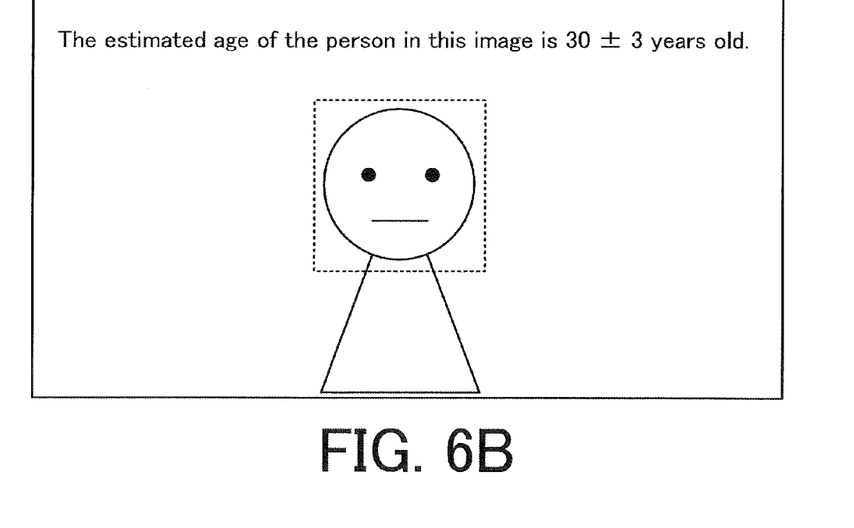

Although the reliability is provided using the evaluation value or the score in one or more of the above embodiments, the reliability may be provided using an error of the estimated age ($\pm n$ years), into which the evaluation value is converted. For example, the correspondence between the evaluation values and errors may be stored in a table or expressed as a mathematical formula. The range of ages may be determined using such information. FIG. 6B shows a screen displaying an error of the estimated age into which the evaluation value is converted.

Although the variance and the standard deviation used to calculate the evaluation value are typically calculated using the average of the estimated ages output from the classifiers, these values may be calculated using the median or the mode instead of the average. More specifically, these values may be calculated using the square sum of a difference from the median or from the mode.

Although the apparatus according to one or more of the above embodiments provides the final age estimate and the evaluation value to the user by displaying them on the screen, the apparatus may include a communication unit replacing the input-output unit. The communication unit may transmit the final age estimate and the evaluation value to other apparatuses.

Although the input data to estimate age is a single image in one or more of the above embodiments, the input image data may include frames forming video. The input data may also be voice data or other binary data. The subject may be any subject for which the feature quantities can be calculated.

The evaluation value defined in one or more of the above embodiments correlates with the reliability in patterns 1 to 4 each showing the relationship between the variations and the evaluation value. However, the evaluation value may be calculated with other methods that can determine the reliability based on the variations across the classification results obtained from the classifiers.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An identification apparatus, comprising:
    data obtaining circuitry that obtains input data;
    feature quantity obtaining circuitry that obtains a feature quantity corresponding to the input data;
    a plurality of classifiers that receives input of the feature quantity, performs classification based on the input feature quantity, and outputs a single first class value, which is a value corresponding to a class obtained by the classification, respectively;
    identification circuitry that inputs the feature quantity into each of the classifiers, and generates a second class value, which is a single classification result, based on a plurality of the first class values obtained from the classifiers; and
    reliability generation circuitry that generates a reliability of the second class value based on variations across the plurality of the first class values,
    wherein the reliability generation circuitry generates the reliability so that the magnitude of the variation of the plurality of the first class values and the magnitude of the reliability of the second class value have a negative correlation.

2. The identification apparatus according to claim 1, wherein the reliability generation circuitry generates the reliability of the second class value based on a variance or a standard deviation of class values output from the classifiers.

3. The identification apparatus according to claim 2, wherein the reliability generation circuitry determines the variance or the standard deviation using a median or a mode of the class values output from the classifiers.

4. The identification apparatus according to claim 1, further comprising, evaluation circuitry that evaluates an accuracy of each of the classifiers, wherein the identification circuitry or the reliability generation circuitry weights the plurality of the first class values in accordance with the evaluated accuracy of the corresponding classifier, and generates the second class value or the reliability.

5. The identification apparatus according to claim 4, wherein the evaluation circuitry evaluates the accuracy of each classifier using test data.

6. The identification apparatus according to claim 4, wherein the evaluation circuitry evaluates the accuracy of each classifier using the number of learning samples used for learning of the classifier.

7. The identification apparatus according to claim 1, wherein the input data comprises an image.

8. The identification apparatus according to claim 7, wherein a target for classification performed by each classifier comprises at least one of an attribute or a state of a person included in the image.

9. A method for controlling an identification apparatus comprising a plurality of classifiers configured to perform classification based on an input feature quantity, the method comprising:
    obtaining input data;
    obtaining a feature quantity corresponding to the input data;
    inputting the obtained feature quantity into each of the classifiers, which outputs a single first class value, which is a value corresponding to a class obtained by the classification, respectively;
    generating a second class value, which is a single classification result, based on a plurality of the first class values obtained from the classifiers; and
    generating a reliability of the second class value based on variations across the plurality of the first class values,
    wherein the reliability is generated so that the magnitude of the variation of the plurality of the first class values and the magnitude of the reliability of the second class value have a negative correlation.

10. A non-transitory computer readable storage medium recording a computer program for causing a computer to perform a method comprising the steps of:
    obtaining input data;
    obtaining a feature quantity corresponding to the input data;
    inputting the obtained feature quantity into each of the classifiers, which outputs a single first class value, which is a value corresponding to a class obtained by the classification, respectively;
    generating a second class value, which is a single classification result, based on a plurality of the first class values obtained from the classifiers; and
    generating a reliability of the second class value based on variations across the plurality of the first class values,
    wherein the reliability is generated so that the magnitude of the variation of the plurality of the first class values and the magnitude of the reliability of the second class value have a negative correlation.

* * * * *